United States Patent [19]

Nakamura et al.

[11] Patent Number: 4,789,599
[45] Date of Patent: Dec. 6, 1988

[54] MAGNETIC RECORDING MEDIUM

[75] Inventors: Eitaro Nakamura, Tokyo; Kotaro Hata, Ichikawa, both of Japan

[73] Assignee: Nippon Zeon Co., Ltd., Tokyo, Japan

[21] Appl. No.: 69,152

[22] Filed: Jul. 2, 1987

[30] Foreign Application Priority Data

Jul. 7, 1986 [JP] Japan ................................ 61-159965
Jul. 7, 1986 [JP] Japan ................................ 61-159966

[51] Int. Cl.$^4$ ......................... G11B 5/702; G11B 5/71
[52] U.S. Cl. .............................. 428/411.1; 427/128; 427/131; 252/62.54; 428/522; 428/694; 428/900; 428/695; 428/413
[58] Field of Search ............ 428/413, 694, 522, 425.9, 428/900, 695, 328, 329, 411.1; 427/128, 131; 252/62.54; 360/134–136

[56] References Cited

U.S. PATENT DOCUMENTS

| | | | |
|---|---|---|---|
| 4,368,237 | 1/1983 | Yamada | 428/413 |
| 4,514,451 | 4/1985 | Suzuki | 428/695 |
| 4,571,364 | 2/1986 | Kasuga | 428/329 |
| 4,600,521 | 7/1986 | Nakamura | 428/694 |
| 4,613,520 | 9/1986 | Dasgupta | 428/694 |
| 4,659,633 | 4/1987 | Yamaguchi | 428/900 |
| 4,707,410 | 11/1987 | Hata | 428/522 |
| 4,707,411 | 11/1987 | Nakayama | 428/900 |

Primary Examiner—Ellis P. Robinson
Attorney, Agent, or Firm—Sherman and Shalloway

[57] ABSTRACT

A magnetic recording medium consisting of a substrate and a magnetic layer formed thereon, said magnetic layer comprising (I) an epoxy group-containing vinyl chloride resin or [I'] both a vinyl chloride resin and an epoxy group-containing resin, [II] a perfluoroalkyl group-containing carboxylic or sulfonic acid compound, and [III] a magnetic powder.

19 Claims, No Drawings

MAGNETIC RECORDING MEDIUM

This invention relates to an improved magnetic recording medium, and more specifically, it relates to a magnetic recording medium having excellent magnetic powder dispersibility, thermal stability and durability.

Magnetic recording media such as magnetic tapes or cards are generally produced by coating a magnetic coating composition comprising a magnetic powder and a binder therefor on a substrate such as a polyester film to form a magnetic layer on it. To attempt to increase the S/N ratio or magnetic recording density of magnetic recording media, finely divided magnetic powders having a high specific surface area have come into use as the aforesaid magnetic powder.

However, if vinyl chloride copolymer resins such as vinyl chloride/vinyl acetate/vinyl alcohol copolymer resin, vinyl chloride/vinyl acetate/maleic acid copolymer resin or vinyl chloride/vinyl acetate/maleic acid/-vinyl alcohol copolymer resin are used as binders for such finely divided magnetic powders, the resulting magnetic coating compositions are thickened or the dispersibility of the magnetic powders therein is not sufficient.

Application of a high shearing force at the time of dispersion is known as a technique for increasing the dispersibility of a magnetic powder. This method, however, induces thickening of the coating composition and thermal decomposition of the vinyl chloride copolymer resin as a result of temperature rise. It further has the defect that the hydrogen chloride gas generated deteriorates the magnetic powder and reduces the durability of the resulting magnetic recording medium, and the magnetic recording medium loses reliability.

One known method of preventing thermal decomposition of vinyl chloride copolymer resins is to add stabilizers therefor. Typical examples are the addition of low-molecular-weight epoxy compounds such as epoxidized soybean oil or n-butyl glycidyl ether, and the addition of liquid organotin compounds such as dibutyltin laurate or dibutyltin maleate.

When such a low-molecular-weight epoxy compound is present in a large amount in the magnetic recording medium, it bleeds out from the medium to reduce the durability of the magnetic recording medium or contaminate the recording head. Accordingly, its amount, and consequently, its effect, are naturally restricted. The organotin compound, on the other hand, acts as a catalyst for a crosslinking reaction of an isocyanate compound generally added to the binder. Hence, the pot life of the resulting magnetic coating composition becomes extremely short. Furthermore, the stability of the coating composition is reduced, and its viscosity increases greatly during coating. As a result, the dispersibility of the magnetic powder is reduced or the surface smoothness of the magnetic layer is impaired.

On the other hand, a magnetic tape having a magnetic layer with a smooth surface obtained by highly dispersing a finely divided magnetic powder having a high coercive force to meet the need for higher recording density and higher S/N ratio has increased frictional resistance between a head guide and the tape, and the travelling property of the tape is reduced.

In an attempt to solve such a problem, it has been the previous practice to incorporate a lubricant typified by silicone oils, fluorine resins, and fatty acids or ethers, esters, amides and fluorinated products thereof, or fine particles such as carbon black or alumina in the magnetic layer. On long-term standing, however, the lubricant may bleed out or is liable to cause instability of the dispersion of the magnetic coating composition or the non-uniformity of the magnetic layer after coating. These troubles ar likely to reduce the storability or electromagnetic converting characteristics of the resulting tape. In particular, when a perfluoroalkylsulfonic or carboxylic acid is used as a lubricant, its high acid strength may make the magnetic coating composition unstable, attack the magnetic layer or contaminate the head or guide. It has been reported that such a lubricant is sometimes used as one component of a backcoat paint. With such a backcoat, the same problem arises because of the bleed-out phenomenon after standing for long periods of tie. On the other hand, the fine particles reduce the fillability of the magnetic powder in the magnetic layer, and their amount is naturally limited.

The present inventors have made extensive investigations in order to solve the problems of the thermal decomposition of vinyl chloride copolymer resins at the time of preparing a high-density magnetic recording medium and the consequent reduced durability of the medium, and to obtain both excellent surface property and travelling property. These investigations have led to the discovery that by using an epoxy group-containing vinyl chloride resin or a combination of a vinyl chloride resin and an epoxy group-containing resin as a binder for magnetic powders, and combining it with a perfluoroalkyl group-containing carboxylic or sulfonic acid compound, a high density magnetic recording medium having excellent durability and travelling property can be obtained while maintaining high thermal stability at the time of preparing a magnetic coating composition for making the magnetic layer of the recording medium.

Thus, according to this invention, there are provided a magnetic recording medium consisting of a substrate and a magnetic layer formed thereon, said magnetic layer comprising an epoxy group-containing vinyl chloride resin, a perfluoroalkyl group-containing carboxylic or sulfonic acid compound and a magnetic powder (first invention); and a magnetic recording medium consisting of a substrate and a magnetic layer formed thereon, said magnetic layer comprising a vinyl chloride resin, an epoxy group-containing resin, a perfluoroalkyl group-containing carboxylic or sulfonic acid compound, and a magnetic powder (second invention).

The epoxy group-containing vinyl chloride resin used in the first invention can be obtained, for example, by (1) polymerizing vinyl chloride and an epoxy groupcontaining radical-polymerizable monomer copolymerizable with vinyl chloride and as required, a monomer copolymerizable with these monomers, or (2) heating polyvinyl chloride or a copolymer resin composed mainly of vinyl chloride units, or a chlorinated product of any of these or contacting it with a dehydrochlorinating agent, and epoxidizing the resulting partially dehydrochlorinated resin with an epoxidizing agent such as a peroxycarboxylic acid. The epoxy group-containing chlorinated polyvinyl chloride resin may be obtained by the method (2) using a chlorinated polyvinyl chloride resin or a chlorinated vinyl chloride copolymer resin as a starting material.

Examples of the epoxy group-containing monomer used in the production of the epoxy group-containing vinyl chloride resin include glycidyl ethers of unsaturated alcohols such as allyl glycidyl ether and methallyl glycidyl ether; glycidyl esters of unsaturated acids such as glycidyl acrylate, glycidyl methacrylate, glycidyl p-vinylbenzoate, methyl glycidyl itaconate, glycidyl ethylmaleate, glycidyl vinylsulfonate and glycidyl (meth)allylsulfonate; and epoxide olefins such as butadiene monoxide, vinylcyclohexene monoxide and 2-methyl-5,6-epoxyphexene.

Examples of the epoxy group-containing monomer and the optional monomer other than vinyl chloride include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; unsaturated carboxylic acid esters such as ethyl maleate, butylbenzyl maleate, di-2-hydroxyethyl maleate, dimethyl itaconate, methyl (meth)acrylate, ethyl (meth)acrylate, lauryl (meth)acrylate and 2-hydroxypropyl (meth)acrylate; olefins such as ethylene and propylene; unsaturated nitriles such as (meth)acrylonitrile; and aromatic vinyl compounds such as styrene, alpha-methylstyrene and p-methylstyrene.

The vinyl chloride resin in the second invention includes, for example, a homopolymer of vinyl chloride and copolymers of vinyl chloride with other monomers, and after reaction products of these polymers. Examples of the other monomer may be the same as those given hereinabove with regard to the first invention.

The comonomer for vinyl chloride is properly selected according, for example, to the need for improving the compatibility of the resin used in this invention with another resin to be mixed with it, for adjusting the softening point of the resin, for increasing the solubility of the resin, or for improving the characteristics of the coated magnetic layer and the coating step.

Those vinyl chloride resins used in the first and second inventions into which hydrophilic groups have been introduced to increase the dispersibility of the magnetic powder are more suitable as the binder. The hydrophilic groups to be used may, for example, be $COOM$, $SO_3M$, $SO_4M$, $PO_3M_2$ and $PO_4M_2$ in which M represetns hydrogen, an alkali metal or ammonium.

The content of the epoxy groups in the vinyl chloride resin used in the first invention is desirably 0.1 to 20% by weight. If it is less than 0.1% by weight, the purpose of this invention is difficult to achieve. If it is larger than 20% by weight, the amount of vinyl chloride decreases relatively, and the properties of the resin are degraded. The proportion of vinyl chloride in the vinyl chloride resins used in the first and second inventions is usually at least 20% by weight, preferably 50 to 95% by weight. If it is below 20% by weight, the properties of the resin are degraded, and the resin cannot be used as a binder because the strength of a film from it is low. Furthermore, this resin preferably has an average degree of polymerization of 100 to 1000. If its average degree of polymerization is less than 100, the film strength and thermal stability of the resulting magnetic layer are poor. If it exceeds 1000, the dispersibility of the magnetic powder or the solubility of the resin is reduced.

Examples of the epoxy group-containing resin in the second invention are epoxy group-containing polyurethane resins, epoxy group-containing polyester resins, epoxy group-containing acrylonitrile/butadiene copolymer resin, and epoxy resins.

Epoxy group-containing polyurethane resins having a molecular weight of 1,000 to 200,000 are used in this invention. If the molecular weight is less than 1,000, the durability of the coated film is insufficient. If it exceeds 200,000, the viscosity of the coating composition becomes too high to cause troubles in practical applications. Epoxy group-containing polyurethane resins can be synthesized, for example, by reacting polyisocyanates with epoxy group-containing polyesters obtained by reacting epoxypolyols (obtained by modifying epoxy resins with amines) or epoxy resins having at least two hydroxyl groups per molecule (i.e., bisphenol A-type, halogenated bisphenol-type, resorcinol-type or bisphenol F-type epoxy resins) with dibasic acids such as adipic acid, phthalic acid, dimerized linolenic acid or maleic acid, or epoxy group-containing polyesters to be described hereinbelow. Alternatively, they can also be synthesized by the action of epoxidizing agents such as peroxycarboxylic acids on polyurethane resins synthesized from unsaturated polyester resins obtained by reacting unsaturated carboxylic acids such as maleic acid, fumaric acid and itaconic acid with polyhydric alcohols.

Epoxy group-containing polyester resins having a molecular weight of 1,000 to 200,000 are used in this invention. If the molecular weight is less than 1,000, the durability of the resulting coated film is insufficient. If it exceeds 200,000, the viscosity of the coating composition becomes too high and troubles occur in practical applications. The epoxy group-containing polyesters are obtained by epoxidizing unsaturated polyester resins with epoxidizing agents such as peroxycarboxylic acids, the unsaturated polyester resins being obtained by thermal condensation of unsaturated dibasic acids such as maleic acid, fumaric acid and itaconic acid or saturated dibasic acids such as phthalic acid, adipic acid and terephthalic acid and polyols such as 1,4-butanediol, 1,5-pentanediol, 1,6-hexanediol, 1,10-decanediol and a butadiene oligomer both ends of which are terminated with hydroxyl groups. Instead of the unsaturated polyester resins, modified unsaturated polyester resins obtained by ester-interchange reaction between these unsaturated polyester resins and polycarbonate resins or saturated polyester resins in the presence of catalysts may be used as the starting materials.

As the epoxy group-containing acrylonitrile/butadiene copolymer resins, those having an acrylonitrile content of 12 to 50% by weight and a molecular weight of 5,000 to 500,000 are generally used in this invention. If the acrylonitrile content is less than 12%, the epoxy group-containing acrylonitrile/butadiene copolymer resin has poor compatibility with other binders generally used in magnetic recording media, such as polyvinyl chloride and nitrocellulose. If it is larger than 50% by weight, the solvent solubility of the resin is decreased, and the dispersibility of the magnetic powder is greatly reduced. If the molecular weight is less than 5,000, the resulting coated film has low durability. If it exceeds 500,000, the resulting coating composition is too high to be practical. The epoxy group-containing acrylonitrile/butadiene resin can be obtained by copolymerizing acrylonitrile, butadiene and an epoxy group-containing radicalcopolymerizable monomer and as required, another copolymerizable monomer, in the presence of a radical initiator. It can also be obtained by reacting an acrylonitrile/butadiene resin with an epoxidizing agent such as a peroxycarboxylic acid to partially epoxidize the double bonds in the resin.

Epoxy resins having a molecular weight of 500 to 200,000 are used in this invention. If the molecular weight is less than 500, the resulting coated film has low durability, and the unreacted materials may bleed out onto the surface of the magnetic layer. If it exceeds 200,000, the resulting coating composition has too high a viscosity to be practical. Specific examples of the epoxy resins are epoxy resins derived from bisphenol A, halogenated bisphenols, resorcinol, bisphenol F or tetrahydroxyphenylethane and epichlorohydrin, and novolak-type epoxy resins.

The epoxy group-containing resin used in the second invention may contain functional groups such as $COOM$, $SO_3M$, $SO_4M$, $PO_3M_2$ and $PO_4M_2$ in which M is hydrogen, alkali metal or ammonium in order to improve the dispersibility of the magnetic powder.

To achieve the effect of the second invention, the proportion of the epoxy group-containing resin is desirably 5 to 70% by weight based on the total weight of it and the vinyl chloride resin, and the proportion of the epoxy groups is desirably 0.1 to 20% by weight based on the vinyl chloride resin.

Each of the amount of the epoxy group-containing vinyl chloride resin (first invention) and the total amount of the vinyl chloride resin and the epoxy group-containing resin (the second invention) is usually 5 to 50 parts by weight, particularly 10 to 30 parts by weight, per 100 parts by weight of the magnetic powder.

Examples of the perfluoroalkyl group-containing carboxylic acid compound used in this invention are perfluoroalkylcarboxylic acids such as perfluorododecanoic acid $[CF_3(CF_2)_{10}COOH]$, perfluorooctanoic acid $[CF_3(CF_2)_6COOH]$ and perfluoropropionic acid $(C_2F_5COOH)$; perfluoroalkylhydroalkylcarboxylic acids such as perfluorooctylhydromethylenecarboxylic acid $[CF_3(CF_2)_7CH_2COOH]$; omega-monohydroperfluoroalkylcarboxylic acids such as omega-monohydroperfluoroundecanoic acid; and carboxylic acids having a perfluoroalkyl polyether, such as

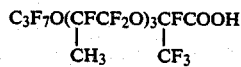

prepared from perfluoro-1,2-epoxypropane.

Examples of the perfluoroalkyl group-containing sulfonic acid compound include perfluoroalkylsulfonic acids such as perfluorooctylsulfonic acid $[CF_3(CF_2)SO_3H]$; perfluoroperfluoro(alkyl)alkenylaryl ether sulfonic acids such as perfluoroperfluorodiisopropylpropenylphenyl ether sulfonic acid $[C_9F_{17}O(C_6H_4)SO_3H]$; and sulfonic acids having a perfluoroalkylpolyether such as

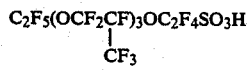

prepared from perfluoro-1,2-epoxypropane.

The amount of the perfluoroalkyl group-containing carboxylic or sulfonic acid compound used in this invention is desirably such that it contains the acid in a chemical equivalent 0.05 to 3.00 times the chemical equivalent of the epoxy groups in the epoxy group-containing vinyl chloride resin in the case of the first invention and the chemical equivalent of the epoxy groups in the epoxy group-containing resin in the case of the second invention. If it is less than 0.05 times, it is difficult to increase the durability of the magnetic layer as intended by the present invention. If it exceeds 3.00 times, the dispersibility of the magnetic powder is reduced, and the durability of the magnetic layer is also reduced.

In the present application, a known flexible resin such as polyurethane resins, polyester resins and acrylonitrile/butadiene copolymer resin may be used as a binder in addition to the resins defined in the first and second inventions in order to improve adhesion and impart durability. These flexible resins may contain epoxy groups, and may also contain functional groups such as $COOM$, $SO_3M$, $SO_4M$, $PO_3M_2$ and $PO_4M_2$ in which M is hydrogen, alkali metal or ammonium.

The magnetic powder that can be used in this invention may, for example, be powders of Fe, Co, Fe alloys, Co-containing gamma-$Fe_2O_3$, Co-containing $Fe_3O_4$, gamma-$Fe_2O_3$, $Fe_3O_4$ barium-ferrite.

As required, it is possible to use conventional materials such as lubricants, dispersants, antistatic agents and polishing agents and conventional resins for magnetic coating compositions such as phenoxy resins, cellulose resins, amino resins, butyral resins and acrylic resins in amounts which do not impair the object of this invention. Furthermore, polyisocyanate compounds normally used in the art may be added in ordinary amounts to perform crosslinking reaction with isocyanates.

The magnetic coating composition may be prepared by mixing the epoxy group-containing vinyl chloride resin, or both the vinyl chloride resin and the epoxy group-containing resin, the aforesaid acid compound and the magnetic powder with the desired components described hereinabove and dispersing the mixture in an organic solvent. The magnetic recording medium of the invention can be obtained by coating the magnetic coating composition on a substrate such as a polyester film in a customary manner by any desired means such as spraying or roll coating, and drying it to form a magnetic layer on the substrate.

The magnetic recording medium of the invention so obtained has better thermal stability, magnetic powder dispersibility, durability and travelling property than conventional magnetic recording media.

The increased thermal stability obtained by this invention is presumably because hydrogen chloride generated by thermal decomposition of the vinyl chloride resin is captured by the epoxy groups in the molecular chain and therefore, a chain reaction due to the decomposition is prevented. This effect is obtained by adding an epoxy group-containing compound to a binder system. According to this invention, a very good improving effect can be obtained without problems such as contamination of the recording head owing to bleed-out onto the surface of the magnetic layer and the degraded travelling property of the tape owing to its increased tackiness as compared with the case of adding known compounds, for example low-molecular-weight compounds such as epoxidized soybean oil.

Furthermore, the travelling property, abrasion resistance and durability of the magnetic recording medium are increased presumably because in the steps of dispersion of the magnetic coating composition, coating, surface shaping and crosslinking and aging, the epoxy groups react with the acid and the perfluoroalkyl groups having lubricating property exist in the magnetic layer and on its surface in a form fixed to the resins.

The binder resin in accordance with this invention containing the perfluoroalkyl group-containing carboxylic or sulfonic acid compound is also useful for forming a back surface coat intended to improve the travelling property of a magnetic recording medium.

The following examples illustrate the present invention more specifically. All parts and percentages in Examples and Referential Examples given below are by weight unless otherwise specified.

REFERENTIAL EXAMPLE 1

A vinyl chloride copolymer resin (A) having an epoxy group content of 3.5%, a —$SO_4$ content of 0.7%, a hydroxyl group content of 0.7% and a vinyl chloride content of 84% was prepared by emulsion-polymerization of allyl glycidyl ether, vinyl chloride and 2-hydroxypropyl methacrylate in the presence of potassium persulfate.

REFERENTIAL EXAMPLE 2

A vinyl chloride copolymer resin (B) having an epoxy group content of 3%, a vinyl acetate content of 5% and a vinyl chloride content of 87% was prepared by suspension-polymerization of vinylcyclohexene monoxide, vinyl chloride and vinyl acetate in the presence of 2,2'-azobisisobutyronitrile.

REFERENTIAL EXAMPLE 3

A vinyl chloride copolymer resin (C) having an epoxy group content of 1.5%, a —$SO_3Na$ content of 1.0% and a vinyl chloride content of 87% was prepared by emulsion-polymerization of vinyl chloride, allyl glycidyl ether and sodium styrenesulfonate in the presence of potassium persulfate.

EXAMPLE 1

[Thermal Stability Test]

One gram of each of the vinyl chloride copolymer resins shown in Table 1 and 1 g of polyurethane resin (Nippolan 2304, a tradename for a product of Nippon Polyurethane Industry Co., Ltd.) were dissolved in tetrahydrofuran, and each of the acid compounds shown in Table 1 was added in a chemical equivalent 0.8 times the chemical equivalent of the epoxy groups in the vinyl chloride copolymer resin. Furthermore, 0.4 g of polyisocyanate (Coronate L, a tradename for a product of Nippon Polyurethane Industry Co., Ltd.) was added. The resulting dispersion was coated by means of a doctor blade and the solvent was volatilized to prepare a cast film.

One gram of the cast film was taken into a 15 cc test tube, and its opening portion was stopped with adsorbent cotton with Congo Red paper inserted in it. The test tube was placed in an oil bath maintained at 150° C., and the time (minutes) which elapsed until the Congo Red test paper changed in color by hydrogen chloride generated was measured. As the time is longer, the thermal stability of the vinyl chloride copolymer resin is determined to be higher.

[Gloss Test]

Four hundred parts of cobalt-doped magnetic iron oxide powder, 70 parts of each of the vinyl chloride copolymer resins shown in Table 1, 30 parts of the same polyurethane resin as used in Thermal Stability Test, each of the carboxylic or sulfonic acid compounds shown in Table 1 in a chemical equivalent 0.8 times the chemical equivalent of the epoxy groups in the vinyl chloride copolymer resin, 300 parts of methyl ethyl ketone, 300 parts of methyl isobutyl ketone and 300 parts of toluene were mixed. The mixture was dispersed under high-speed shear for 90 minutes, and further 20 parts of the same polyisocyanate as used in Thermal Stability Test was added. They were mixed and dispersed for 10 minutes to prepare a magnetic coating composition. The resulting magnetic coating composition was coated on polyester film to a thickness of 5 micrometers, subjected to field orientation treatment, and then dried. The reflectance of the magnetic coated film at an incidence angle of 60° was measured by a glossmeter. Larger measured values show better dispersibility of the magnetic powder. [Durability Test]

The magnetic coated film used in Gloss Test was smoothed by a calender roll, and then crosslinked and aged in a constant temperature vessel at 65° C. for 40 hours. The magnetic coated film was then brought into contact under a load of 100 g with a rotating drum, 40 mm in diameter, having abrasive paper bonded to it. After rotating the drum at 150 rpm for a predetermined period of time, the degree of stain adhering to the abrasive paper was visually observed, and rated on a scale of three grades as follows:
O: No stain
Δ: Some stain
X: Marked stain.

[Travelling Property Test]

The same magnetic coated film as used in Gloss Test was smoothed and crosslinked asiin Durability Test, and then brought into contact with a rotating drum having a mirror surface to which a hard chrome plating had been applied. The force generated between the drum and the magnetic coated film was measured by a U gage in an atmosphere kept at 65° C. and 80% RH. Based on the measured force, the travelling resistance was expressed on a scale of the following three grades.
O: Low resistance
Δ: Medium resistance
X: High resistance

[Bleed Test]

The same magnetic coated film as used in Gloss Test was kept in contact with an aluminum plate, and left to stand for 7 days in a constant-temperature constant-humidity vessel at 45° C. and 95% RH. The surface of the aluminum plate with which the surface of the magnetic coated film was kept in contact was visually observed for changes. The result was expressed on a scale of two stages.
O: No change
X: Change occurred The results of the above tests are summarized in Table 1.

TABLE 1

| Run No. | Vinyl chloride copolymer | Acid compound (chemical formula) | Thermal stability | Gloss (%) | Durability | Travelling property | Bleed |
|---|---|---|---|---|---|---|---|
| 1 | A | $C_7F_{15}COOH$ | 41 | 82 | O | O | O |
| 2 | B | $C_7F_{15}COOH$ | 40 | 67 | O | O | O |

TABLE 1-continued

| Run No. | Vinyl chloride copolymer | Acid compound (chemical formula) | Thermal stability | Gloss (%) | Dura-bility | Travelling property | Bleed |
|---|---|---|---|---|---|---|---|
| 3 | C | $C_9F_{17}O$—⟨phenyl⟩—$SO_3H$ | 38 | 78 | O | O | O |
| 4 | A | $C_8F_{17}SO_3H$ | 41 | 82 | O | O | O |
| *5 | A | — | 52 | 82 | X | X | O |
| *6 | A | $C_7H_{15}COOH$ | 39 | 80 | X | △ | △ |
| *7 | B | — | 39 | 32 | X | X | O |
| *8 | VAGH** | — | 3 | 60 | △ | X | O |
| *9 | VAGH** | $C_7F_{15}COOH$ | 3 | The magnetic powder flocculated and did not form a magnetic coating composition | | | |

*Comparative runs
**Vinyl chloride/vinyl acetate/vinyl alcohol copolymer resin produced by UCC

REFERENTIAL EXAMPLE 4

To epoxypolyol obtained by modifying a bisphenol A-type epoxy resin with an amine was added 4,4'-diphenylmethane diisocyanate. The mixture was heated to give an epox group-containing polyurethane resin having a molecular weight of about 17,000 and an epoxy group content of 10%.

REFERENTIAL EXAMPLE 5

An unsaturated polyester resin obtained by thermally condensing maleic anhydride, mixed phthalic acid and 1,4-butanediol was epoxidized with peroxyacetic acid in toluene to give an epoxy group-containing polyester resin having a molecular weight of 9,000 and an epoxy group content of 6%.

REFERENTIAL EXAMPLE 6

An acrylonitrile/butadiene copolymer resin having a acrylonitrile content of 30% and an average molecular weight of 30,000 was partially epoxidized with peroxyacetic acid to give an epoxy group-containing acrylonitrile/butadiene copolymer resin having an epoxy group content of 8%.

EXAMPLE 2

[Thermal Stability Test]

One gram of each of the vinyl chloride copolymer resins shown in Table 2 and 1 g of each of the epoxy group-containing resins shown in Table 2 were dissolved in tetrahydrofuran. To the solution were added 0.2 g of each of the acid compounds shown in Table 2 and 0.4 g of polyisocyanate (Coronate L, a tradename for a product of Nippon Polyurethane Industry Co., Ltd.). The resulting dispersion was coated by means of a doctor blade and the solvent was volatilized to prepare a cast film. Using the cast film, the same thermal stability test as in Example 1 was conducted.

[Gloss Test]

Gloss was measured in the same way as in Example 1 except using a mixture composed of 400 parts of cobalt-doped magnetic iron oxide powder, 70 parts of each of the vinyl chloride resin shown in Table 2, 30 parts of the same epoxy group-containing resin as used in Thermal Stability Test, 8 parts of each of the acid compounds shown in Table 2, 300 parts of methyl ethyl ketone, 300 parts of methyl isobutyl ketone and 300 parts of toluene.

[Durability Test]

The test was conducted in the same way as in Example 1 using the same magnetic coated film as used in Gloss Test.

[Travelling Property Test]

The test was conducted in the same way as in Example 1 using the same magnetic coated film as used in Gloss Test.

[Bleed Test]

The test was conducted in the same way as in Example 1 using the same magnetic coated film as used in Gloss Test.

The test results are summarized in Table 2.

TABLE 2

| Run No. | Vinyl chloride resin | Epoxy group-containing resin | Acid compound | Thermal stability (minutes) | Gloss | Dura-bility | Travelling property | Bleed |
|---|---|---|---|---|---|---|---|---|
| 1 | Commercial resin A** | Epoxy group-containing polyurethane of Referential Example 4 | $C_7F_{15}COOH$ | 29 | 65 | O | O | O |
| 2 | Commercial resin A** | Epoxy group-containing polyester of Referential Example 5 | $C_8F_{17}SO_3H$ | 28 | 69 | O | O | O |
| 3 | Commercial resin A** | Epoxy group-containing acrylonitrile/butadiene copolymer resin of Referential Example 6 | $C_9F_{17}O$—⟨phenyl⟩—$SO_3H$ | 30 | 63 | O | O | O |
| 4 | Commercial resin B*** | Epoxy group-containing polyester of | $HC_{10}F_{20}COOH$ | 27 | 66 | O | O | O |

TABLE 2-continued

| Run No. | Vinyl chloride resin | Epoxy group-containing resin | Acid compound | Thermal stability (minutes) | Gloss | Durability | Travelling property | Bleed |
|---|---|---|---|---|---|---|---|---|
| 5* | Commercial resin A** | Referential Example 5 Nippolan 2304 (a product of Nippon Polyuretane) | $C_7F_{15}COOH$ | 3 | \multicolumn{4}{l}{The magnetic powder flocculated and did not form a magnetic coating composition.} |
| 6* | Commercial resin A** | Epoxy group-containing AB copolymer resin of Referential Example 6 | — | 30 | 49 | Δ | X | O |
| 7* | Commercial resin A** | Epoxy group-containing AB copolymer resin of Referential Example 6 | $C_7H_{15}COOH$ | 29 | 48 | Δ | Δ | X |

*Comparison
**Vinyl chloride/vinyl acetate/vinyl alcohol copolymer resin
***Vinyl chloride/vinyl acetate/maleic acid/vinyl alcohol copolymer resin The results given in Tables 1 and 2 demonstrate that the present invention gives magnetic recording media which are excellent in any of the properties shown in the tables.

What is claimed is:

1. A magnetic recording medium consisting of a substrate and a magnetic layer formed thereon, said magnetic layer comprising an epoxy group-containing vinyl chloride resin, a perfluoroalkyl group-containing carboxylic or sulfonic acid and a magnetic powder,
    wherein the vinyl chloride content of said epoxy group-containing vinyl chloride resin is at least 20% by weight,
    wherein said epoxy group-containing vinyl chloride resin has an average degree of polymerization of 100 to 1,000, and
    wherein said epoxy group-containing vinyl chloride resin is present in an amount of 5 to 50 parts by weight for each 100 parts by weight of said magnetic powder.

2. The magnetic recording medium of claim 1 wherein the epoxy group-containing vinyl chloride resin is obtained by (1) polymerizing vinyl chloride and an epoxy group-containing radical-polymerizable monomer copolymerizable with vinyl chloride, and as required, another monomer copolymerizable with these monomers, in the presence of a radical initiator, or (2) epoxidizing a resin obtained by partially dehydrochlorinating polyvinyl chloride, a copolymer resin comprising vinyl chloride as main units, or a chlorinated product thereof by heating or contacting with a dehydrochlorinating agent.

3. The magnetic recording medium of claim 2 wherein the epoxy group-containing radical polymerizable monomer is selected from glycidyl ethers of unsaturated alcohols, glycidyl esters of unsaturated acids and epoxide olefins.

4. The magnetic recording medium of claim 2 wherein the other monomer is selected from vinyl esters of carboxylic acids, vinyl ethers, vinylidene halides, unsaturated carboxylic acid esters, olefins, unsaturated nitriles and aromatic vinyl compounds.

5. The magnetic recording medium of claim 1 wherein the epoxy group-containing vinyl chloride resin has a hydrophilic group.

6. The magnetic recording medium of claim 1 wherein the proportion of the epoxy groups in the epoxy group-containing vinyl chloride resin is 0.1 to 20% by weight.

7. The magnetic recording medium of claim 1 wherein the perfluoroalkyl group-containing carboxylic acid is selected from perfluoroalkylcarboxylic acids, perfluorooalkylhydroalkylcarboxylic acids, omega-monohydroperfluoroalkylcarboxylic acids and perfluoroalkyl polyether-containing carboxylic acids.

8. The magnetic recording medium of claim 1 werein the perfluroalkyl group-containing sulfonic acid is selected from perfluoroalkylsulfonic acids, perfluoroalkylarylethersulfonic acids an perfluoroalkyl-polyether-containing sulfonic acids.

9. The magnetic recording medium of claim 1 wherein the amount of the perfluoroalkyl group-containing carboxylic or sulfonic acid corresponds to a chemical equivalent 0.05 to 3.0 times the chemical equivalent of the epoxy groups in the epoxy group-containing vinyl chloride resin.

10. The magnetic recording medium of claim 1 wherein the amount of the epoxy group-containing vinyl chloride resin is 10 to 30 parts by weight per 100 parts by weight of the magnetic powder.

11. A magnetic recording medium comprising a substrate and a magnetic layer formed thereon, said magnetic layer comprising a vinyl chloride resin, an epoxy group-containing resin, a perfluoroalkyl group-containing carboxylic or sulfonic acid and a magnetic powder,
    wherein said vinyl chloride resin has a vinyl chloride content of at least 20% by weight,
    wherein said vinyl chloride resin has an average degree of polymerization of 100 to 1,000, and
    wherein said epoxy group-containing resin and said vinyl chloride resin are present in a total amount of 5 to 50 parts by weight of said magnetic powder.

12. The magnetic recording medium of claim 11 wherein the vinyl chloride resin is a copolymer of 50 to 95% by weight of vinyl chloride and 50 to 5% by weight of another monomer selected from vinyl esters of carboxylic acids, vinyl ethers, vinylidene halides, unsaturated carboxylic acid esters, olefins, unsaturated nitriles and aromatic vinyl compounds.

13. The magnetic recording medium of claim 11 wherein the epoxy group-containing resin is selected from epoxy group-containing polyurethane resins having a molecular weight of 1,000 to 200,000, epoxy group-containing polyester resins having a molecular weight of 1,000 to 200,000, epoxy group-containing acrylonitrile/butadiene copolymer resins having a molecular weight of 5,000 to 500,000 and epoxy resins having a molecular weight of 500 to 200,000.

14. The magnetic recording medium of claim 11 wherein the proportion of the epoxy group-containing resin is 5 to 70% by weight based on the vinyl chloride resin and the epoxy group-containing resin.

15. The magnetic recording medium of claim 11 wherein the proportion of the epoxy groups is 0.1 to 20% by weight based on the vinyl chloride resin.

16. The magnetic recording medium of claim 11 wherein the perfluoroalkyl group-containing carboxylic acid is selected from perfluoroalkylcarboxylic acids, perfluoroalkylhydroalkylcarboxylic acids, omega-monohydroperfluoroalkylcarboxylic acids and perfluoroalkylpolyether-containing carboxylic acids.

17. The magnetic recording medium of claim 11 wherein the perfluoroalkyl group-containing sulfonic acid is selected from perfluoroalkylsulfonic acids, perfluoroalkylarylethersulfonic acids and perfluoroalkylpolyether-containing sulfonic acids.

18. The magnetic recording medium of claim 11 wherein the amount of the perfluoroalkyl group-containing carboxylic or sulfonic acid corresponds to a chemical equivalent 0.05 to 3.0 times the chemical equivalent of the epoxy groups in the epoxy group-containing resin.

19. The magnetic recording medium of claim 11 wherein the total amount of the vinyl chloride resin and the epoxy group-containing resin is 10 to 30 parts by weight per 100 parts by weight of the magnetic powder.

* * * * *

UNITED STATES PATENT AND TRADEMARK OFFICE
CERTIFICATE OF CORRECTION

PATENT NO. : 4,789,599
DATED : December 6, 1988
INVENTOR(S) : EITARO NAKAMURA ET AL.

It is certified that error appears in the above-identified patent and that said Letters Patent is hereby corrected as shown below:

```
Claim 1, line 1 of the claim, "consisting of" should
      read --comprising--.

Claim 8, line 4 of the claim, "an" should read --and--.
```

Signed and Sealed this

Second Day of May, 1989

*Attest:*

DONALD J. QUIGG

*Attesting Officer*    Commissioner of Patents and Trademarks